Sept. 7, 1954
B. B. LAUBHAN
2,688,204
COMBINED HELMET AND FISH LANDING NET
Filed Feb. 13, 1950
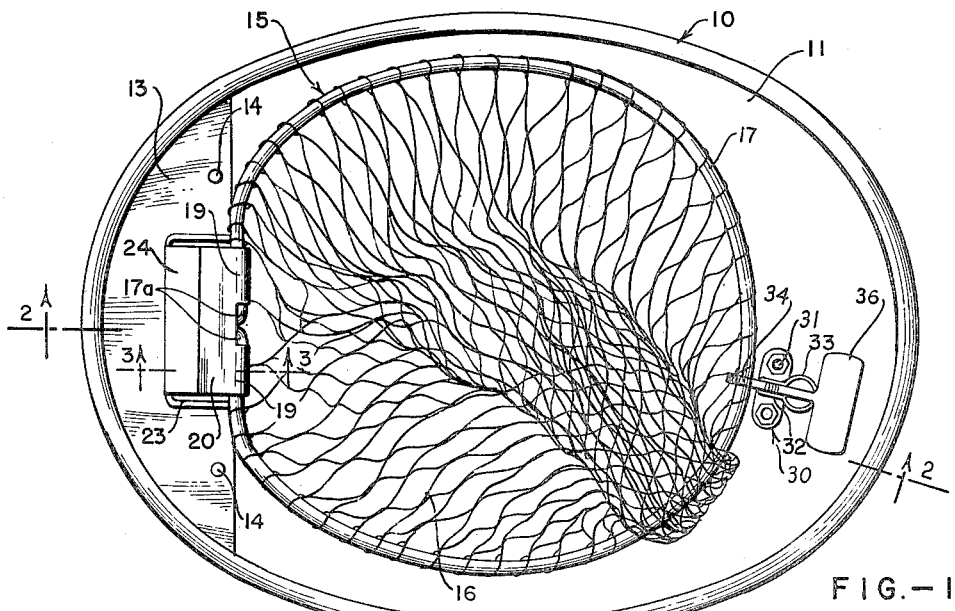
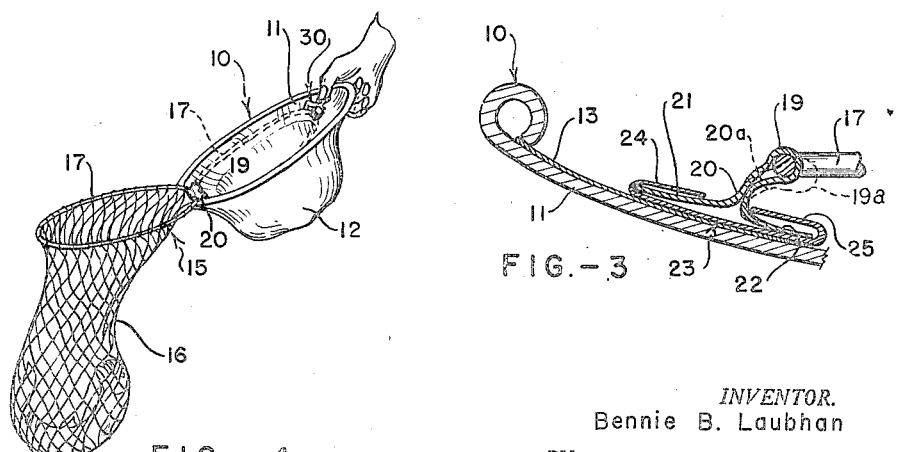
INVENTOR.
Bennie B. Laubhan
BY
ATTORNEY

Patented Sept. 7, 1954

2,688,204

UNITED STATES PATENT OFFICE 2,688,204

COMBINED HELMET AND FISH LANDING NET

Bennie B. Laubhan, Denver, Colo.

Application February 13, 1950, Serial No. 143,939

8 Claims. (Cl. 43—12)

1

The present invention relates to a combined head covering and fish landing net assembly. It has to do particularly, although not exclusively, with a helmet-like head covering which is provided with a relatively stiff surrounding brim portion and a relatively stiff crown portion having swingably or hingedly attached to the under surface thereof, a fish landing net which is adapted to be held in out-of-use position and to be virtually hidden when the helmet is worn, and wherein suitable releasable latching means is provided for maintaining the net in its out-of-use position and for releasing the net whereby it will swing toward a position of use when the helmet is removed from the head of the wearer.

As is well known, it is essential when fishing for trout or other game fish to have a landing net ready for immediate use, since it is extremely difficult to land a trout, or other game fish without such equipment, whether while stream fishing by wading or when fishing from a bank or boat.

It is common practice to carry a relatively short-handled small net which must necessarily be tied or otherwise attached to the clothing of the fisherman, usually hanging from the clothing at his side. When traveling through brush or other growth, the netting frequently becomes entangled and requires that the fisherman stop and disentangle it. Often the net becomes entangled when fishing and usually at the crucial moment when it is needed for landing a fish. Therefore, at least under certain conditions, presently known nets, and the manner in which they are carried by fishermen, are not wholly practicable and at times cause unnecessary inconvenience and delay.

It is, therefore, one of the important objects of the present invention to provide an improved landing net which may be kept in a protected and out of the way location when not in use and which may be brought to a position for use, immediately it is needed.

A further and important object of the present invention is to provide an improved fish landing net which is incorporated with the structure of an article of head wear, preferably with a sun helmet, or the like hat, which has a relatively stiff or rigid brim portion.

Another object of the present invention is to provide an improved combined helmet-like hat and movable and removable landing net assembly, in which the net is automatically moved to a position of use, upon the removal of the helmet-like hat from the head of the wearer and the release of suitable latching means which normally maintains the net in its out-of-use position.

Another object of the present invention is to provide an improved landing net assembly including tensioned hinge or connecting means

2 which function to shift or swing the net frame and its netting from an out-of-use position to a position of use when desired.

A further object of the present invention is to provide an improved landing net assembly capable of being attached to the under surface of a preferably stiff-brimmed hat so as to be virtually invisible when the hat is being worn; it being another object of the present invention to provide such improved landing net means which will in no way interfere with the usual fit and comfortable wearing of the hat to the brim of which it is applied.

Another object of the present invention is to provide an improved combined helmet and landing net assembly, or an improved landing net assembly capable of being attached to the brim of a helmet, which is of relatively simple construction, easy and inexpensive to manufacture, and simple to install, as well as being efficient in use and of durable nature.

The foregoing and other objects and advantages of the present invention will appear from the following description and appended claims when considered in connection with the accompanying drawing forming a part of this specification wherein like reference characters designate corresponding parts in the several views.

In said drawing:

Fig. 1 is a bottom plan view of a combined helmet-like head covering and fish landing net of the present invention.

Fig. 2 is a fragmentary longitudinal sectional view taken substantially along the line 2—2 of Fig. 1, looking in the direction of the arrows.

Fig. 3 is an enlarged fragmentary detail of the tensioned hinge assembly or movable connecting means between the hat and landing net; and Fig. 4 is a perspective view showing one manner of using the invention of the preceding views.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

As seen in the accompanying drawing, the head covering forming a part of the present invention is a relatively light weight hat or helmet, such as a sun helmet, shown as a whole at 10. The helmet therein shown has a relatively stiff or rigid brim portion 11 and a similarly stiff or rigid crown portion 12. At one end, the brim has secured to its under surface a preferably metal mounting plate or member 13 which may be attached to the helmet brim 11 in any suitable manner, as by means of eyelets or rivets 14, and is relatively inconspicuous. It may be colored to blend with or match the hat brim.

The other main portion of the present invention comprises the fish landing net assembly, shown as a whole at 15. The landing net 15 comprises, as shown, the usual netting 16 which is carried by a generally oval-shaped relatively stiff frame member 17, preferably formed from heavy gage wire. The meeting ends of the wire are passed through spaced and aligned socket portions 19 of a hinge or attaching member 20 to be described fully below, with the terminal ends of the wire frame member 17 being offset, as indicated generally at 17a in Fig. 1, these offset ends being adapted to engage the hinge or connecting member 20 to place the same under tension when the net frame is in its out-of-use position, as seen in Figs. 1 and 2 of the drawing.

The hinge or connecting member comprises the portion 20 which includes the loops or sockets 19, both mentioned above, this portion being carried by the net frame 17. It is to be noted that this member or unit of the hinge is double beyond the sockets 19 and has its lower end portions outwardly flared in opposite directions at 21 and 22, see particularly Figs. 2 and 3.

The other section or unit of the hinge or attaching means comprises a socket-like member, shown as a whole at 23, and having inturned longitudinally extending spaced flanges 24 and 25. This hinge member 23 may be soldered or otherwise connected to the mounting plate 13 to form a fixed portion of the hinge assembly; or it may be removably attached to said plate. The inturned flanges 24 and 25 thereof provide convenient means for receiving and supporting the outwardly flared portions or flanges 21 and 22 of the other hinge member 20, namely that member which is carried by the net frame. Therefore, it will be seen that the hinge member 20 which is attached to the net frame can be slid into position to be supported by and to cooperate with the socket portion 23 of the hinge assembly. Thus, the net frame 17 and netting 16, as well as hinge member or portion 20 carried by the frame, can be readily detached and removed from the socket-like hinge member 23, enabling the helmet 10 to be employed merely as a helmet and without including the improved net, if and when desirable.

At the opposite end of brim 11, there is provided a releasable net frame latching member, shown as a whole at 30. This member is mounted in any suitable manner, as by means of bolts or screws 31 upon the under surface of brim 11. The latch member, as shown, has a body portion 32 with an offset outer end portion or extension 33. A latch member 34 is preferably pivotally mounted at 35 in body portion 32, the latch member having an outwardly extending finger or thumb piece 36. As seen in Fig. 1, the releasable latch member unit 30 is shown as being mounted slightly to the left of a center line extending longitudinally through the helmet, this for the reason that the latch member will be within easy reach of the wearer's left hand and can be operated thereby. It is customary for a fisherman to net his fish by holding the net with his left hand. Therefore, by positioning the releasable latch member 30 as shown in Fig. 1, the fisherman will be able to reach it easily and quickly.

The extension or portion 33 of the latch member base preferably contains a coiled spring (not shown) which engages the latch member to normally hold it in the position in which it is shown in Figs. 1 and 2 of the drawing, with the nose portion 34a thereof overlying and engaging the net frame member 17. Thus, with the parts in the positions in which they are shown in Figs. 1 and 2, it will be seen that the landing net 15 is maintained in its out-of-use position beneath the brim portion 11 of the helmet. It will also be seen that the size of the frame 17 of the net is sufficient to permit the passage of the head of the wearer so that his head may contact the helmet in the usual or customary manner. Therefore, the provision of the movable and removable landing net unit 15 does not afford any discomfort to the wearer of the helmet.

As indicated in Fig. 3, the unit or member 19, 20 of the hinge assembly is formed of metal which is sufficiently springy to be held under tension when the net is in its out-of-use position, being so held, as shown, by virtue of the engagement of the net frame 17 by the latch member. As also seen in Fig. 3, the tensioned position of portions 19, 20 is shown in broken lines at 19a and 20a, respectively. In other words, the parts will assume the broken line position when the net is in its out-of-use position, with its forward end being held in place beneath the hat brim by the latch nose portion 34a.

It is to be understood that the net is held in the position of Figs. 1 and 2 at all times except when in use, with the hinge assembly being held under tension. When now it is desirable to use the landing net, it is simply necessary for the wearer of the helmet to grasp the same by the brim with his left or his right hand, lift the helmet from off his head, while at the same time depressing the finger piece 36 of the latch member with his thumb, thus releasing the net frame member 17, whereupon the tensioned hinge member portions 19 and 20, will swing the net from its out-of-use position to its position of use, as indicated in Fig. 4 of the drawing. In such position, it is merely necessary for the fisherman to bring the net 15 into contact with the fish. After the fish has been thus landed, it is removed from the net in the usual manner, whereupon the net frame is swung back from its position of use to its out-of-use position. In so moving the net to its out-of-use position beneath the helmet brim, the frame member 17 will ride over the nose 34a of the releasable latching member and will become re-engaged with the under side thereof, as best seen in Figs. 1 and 2.

By virtue of the structure and arrangement of parts, with a single motion of the arm, the combined helmet and net may be removed from the head of the fisherman and the net released, whereupon it is moved automatically to open position in readiness to land the fish, with the parts being in substantially their positions of Fig. 4.

While the hand shown in Fig. 4 of the drawing is the right hand of a fisherman, that showing serves to illustrate how the releasable latching member 30 is released at the desired time to permit the spring action of the hinge to shift or swing the net from its brokn line out-of-use position 17 in Fig. 4 to its full line position of use in this view.

A conventional type of helment has been shown in the drawing, merely by way of example. It is to be understood that the present landing net assembly may be applied to hats of other types, it being preferable, however, that the hat have a relatively stiff or rigid brim portion so as to provide proper supporting means for the present invention.

The type of hinge means employed herein, as well as the type of releasable latching means employed, are merely illustrative of various means which could be employed for connecting the hat and landing net.

The portion or unit 23 of the hinge assembly may be secured to the mounting plate or member 13 in any suitable manner. It need not be soldered or welded thereto but may be removably held in place by screws, bolts or the like (not shown).

As stated above, when the helmet is not being used on a fishing expedition, it is a simple matter to remove the landing net and its attached hinge unit, in which case the helmet may be worn as such. The hinge unit 23, if allowed to remain attached to the helmet brim will not interfere with the use of the helmet; nor will the releasable latching means 30 interfere with the normal use of said helmet.

I claim:

1. A landing net assembly adapted to be movably and removably attached to the brim of a hat, comprising a mounting plate carried by said brim, a spring action hinge assembly removably attached to the mounting plate, a relatively stiff net frame attached to said hinge assembly and movable with a portion of said assembly relative to said mounting plate, netting carried by said frame, and releasable latching means attached to the hat brim and being adapted to engage the net frame at a point remote from the hinge assembly to releasably hold the frame and netting in out-of-use position adjacent said brim, said hinge assembly providing means for swinging the frame and netting relative to the hat brim toward a position of use when the latching means is released.

2. In combination, a head covering having a relatively stiff brim portion and a crown, a landing net frame carrying netting and being swingably attached at one of its ends to the under side of said brim portion, a releasable latching member carried by the under side of the brim at the opposite end thereof to engage said frame to hold the same in out-of-use position, and spring action hinge means for swinging the net frame and netting into a position of use upon the release of said releasable latching means.

3. In combination, a helmet-like head covering having a relatively stiff brim portion and a crown portion, a landing net including a stiff wire frame having one end portion hingedly attached to the under side of said brim portion at one end thereof, a spring action hinge assembly connecting the frame of the net and the brim, and releasable latching means carried by the under side of the brim at the opposite end thereof and engageable with said net frame for maintaining said hinge assembly under tension and the net frame in its out-of-use position, whereby upon release of the latching means the net will be swung by the tensioned hinge assembly toward a position of use.

4. A combination according to claim 3, wherein the brim of the helmet-like head covering is provided with a mounting plate for receiving and supporting the hinge assembly, and wherein the hinge assembly comprises a socket-like metal portion held to the mounting plate and a cooperable removable portion attached to the frame of the net.

5. A sun helmet having a relatively stiff brim portion and a relatively stiff crown portion, a substantially oval-shaped fish landing net frame movably attached to said helmet, a fish landing net carried by the frame and adapted to rest upon the wearer's head and be hidden from view by the helmet when the same is in place upon the head of the wearer, a mounting plate-like member attached to the underside of said brim at one end thereof, releasable latching means mounted at the opposite end of the brim for engagement with the corresponding end of the landing net frame to hold the frame and net in out-of-use position, and a spring action hinge assembly disposed between and associated with the mounting plate-like member and the adjacent end portion of the net frame for supportingly connecting the same and for swinging the net frame and net into a position for use when the helmet is removed from the wearer's head and the latching means released.

6. A sun helmet having a relatively stiff brim portion and a relatively stiff crown portion, a substantially oval-shaped fish landing net frame movably attached to said helmet, a fish landing net carried by the frame and adapted to rest upon the wearer's head and be hidden from view by the helmet when the same is in place upon the head of the wearer, a mounting plate-like member attached to the underside of said brim at one end thereof, releasable latching means mounted at the opposite end of the brim for engagement with the corresponding end of the landing net frame to hold the frame and net in out-of-use position, and a spring action hinge assembly disposed between and associated with the mounting plate-like member and the adjacent end portion of the net frame for supportingly connecting the same and for swinging the net frame and net into a position for use when the helmet is removed from the wearer's head and the latching means released, said spring action hinge assembly comprising a socket member attached to the mounting plate-like member and a member carried by the net frame and removably engaging said socket member.

7. A hat having a brim portion and a crown portion, a substantially oval-shaped fish landing net frame movably attached to said hat, a fish landing net carried by the frame and adapted to rest upon the wearer's head and be hidden from view by the hat when the hat is in place upon the head of the wearer, a mounting plate-like member attached to the underside of said brim at one end thereof, a metal hinge assembly interconnecting the mounting plate and the net frame, and releasable latching means mounted at the opposite end of said hat brim engageable with the net frame and holding the hinge assembly under tension while the net and its frame are being held in their out-of-use position, said hinge assembly including means for swinging the landing net frame and net toward a position of use upon release of said latching means.

8. A hat and fish landing net assembly according to claim 7, wherein the metal hinge assembly comprises a socket portion attached to the mounting plate and a removable cooperating portion fitting said socket portion and carried by the landing net frame.

References Cited in the file of this patent
UNITED STATES PATENTS

| Number | Name | Date |
|---|---|---|
| 1,391,841 | Lewis | Sept. 27, 1921 |
| 1,957,944 | Dexter | May 8, 1934 |
| 2,597,447 | Bruns | May 20, 1952 |